US012026942B2

(12) United States Patent
Seo et al.

(10) Patent No.: US 12,026,942 B2
(45) Date of Patent: Jul. 2, 2024

(54) METHOD TO DETECT OBJECT (71) Applicant: SI Analytics Co., Ltd, Daejeon (KR)

(72) Inventors: Junghoon Seo, Gyeonggi-do (KR); Taegyun Jeon, Daejeon (KR)

(73) Assignee: SI ANALYTICS CO., LTD, Daejeon (KR)

( * ) Notice: Subject to any disclaimer, the term of this patent is extended or adjusted under 35 U.S.C. 154(b) by 460 days.

(21) Appl. No.: 17/178,214

(22) Filed: Feb. 17, 2021

(65) Prior Publication Data

US 2022/0058389 A1 Feb. 24, 2022

(30) Foreign Application Priority Data

Aug. 20, 2020 (KR) ........................ 10-2020-0104438

(51) Int. Cl.
*G06V 20/10* (2022.01)
*G06N 3/08* (2023.01)

(52) U.S. Cl.
CPC ............. *G06V 20/182* (2022.01); *G06N 3/08* (2013.01); *G06V 20/176* (2022.01)

(58) Field of Classification Search
CPC .... G06V 20/182; G06V 20/176; G06V 10/82; G06V 20/13; G06V 10/751; G06V 10/10; G06N 3/08; G06N 3/045; G06N 3/048; G06T 7/11
See application file for complete search history.

(56) References Cited

U.S. PATENT DOCUMENTS

| 6,242,745 | B1* | 6/2001 | Berlad | G01T 1/2928 |
| | | | | 250/370.06 |
| 9,996,890 | B1* | 6/2018 | Cinnamon | G06V 10/764 |
| 10,366,293 | B1* | 7/2019 | Faviero | G06N 3/08 |
| 10,452,959 | B1* | 10/2019 | Gautam | G06N 3/02 |
| 10,928,830 | B1* | 2/2021 | Tran | G05D 1/0246 |
| 2006/0062484 | A1* | 3/2006 | Aas | H04N 23/84 |
| | | | | 348/E5.045 |
| 2006/0279767 | A1* | 12/2006 | Lim | H04N 1/00846 |
| | | | | 358/1.14 |
| 2010/0265267 | A1* | 10/2010 | Schaepe | G06V 10/426 |
| | | | | 345/619 |
| 2015/0063671 | A1* | 3/2015 | Shahar | G01T 1/1647 |
| | | | | 382/132 |
| 2016/0241772 | A1* | 8/2016 | Johnson | H04N 23/672 |

(Continued)

FOREIGN PATENT DOCUMENTS

KR 102060567 B1 12/2019

OTHER PUBLICATIONS

Wang, Xiaolong et al., Non-local Neural Networks, Apr. 13, 2018, arXiv:1711.07971v3 [cs.CV].

(Continued)

*Primary Examiner* — Solomon G Bezuayehu
(74) *Attorney, Agent, or Firm* — Umberg Zipser LLP (57) ABSTRACT

According to an exemplary embodiment of the present disclosure, a method of detecting an object is disclosed. The method of detecting an object includes computing an image including an object by using an object detection model including a local block and a non-local block, in which the local block computes a relationship between adjacent pixels included in a feature map, and the non-local block computes a relationship between non-adjacent pixels included in the feature map.

9 Claims, 5 Drawing Sheets

(56) References Cited

U.S. PATENT DOCUMENTS

| | | | |
|---|---|---|---|
| 2016/0267358 A1* | 9/2016 | Shoaib | G06F 18/24 |
| 2018/0032801 A1* | 2/2018 | Gur | G06N 3/08 |
| 2019/0156210 A1* | 5/2019 | He | G06N 3/045 |
| 2020/0117942 A1* | 4/2020 | Cho | G06N 3/045 |
| 2020/0123618 A1* | 4/2020 | Batenchuk | G06V 10/454 |
| 2020/0143204 A1* | 5/2020 | Nakano | G06V 10/82 |
| 2020/0193157 A1 | 6/2020 | Soni | |
| 2020/0365035 A1 | 11/2020 | Im et al. | |
| 2021/0158130 A1* | 5/2021 | Guo | G06N 5/04 |
| 2022/0108545 A1* | 4/2022 | Lee | G06V 10/82 |
| 2022/0368849 A1* | 11/2022 | Hanzawa | H04N 25/42 |

OTHER PUBLICATIONS

Kim, et al., Object-Based Road Extraction from VHR Satellite Image Using Improved Ant Colony Optimization, Journal of the Korean Society of Surveying, Geodesy, Photogrammetry and Cartography 37(3), 2019.6, 109-118 (10 pages), DBPIA, available at https://www.dbpia.co.kr/journal/articleDetail?nodeId=NODE08747228.
Korea Intellectual Property Office, Office Action, Apr. 12, 2021.

* cited by examiner

METHOD TO DETECT OBJECT

CROSS-REFERENCE TO RELATED APPLICATIONS

This application claims priority to and the benefit of Korean Patent Application No. 10-2020-0104438 filed in the Korean Intellectual Property Office on Aug. 20, 2020, the entire contents of which are incorporated herein by reference.

TECHNICAL FIELD

The present disclosure relates to a method of detecting an object, and more particularly, to a method of detecting an object included in an image by using a non-local block.

BACKGROUND ART

It is possible to detect various objects by using a satellite image. Roads, buildings, and the like may be checked through satellite images. When a satellite image is used, parts that cannot be checked due to military issues can be checked. For example, in the event of an explosion and the like, it is possible to check which buildings were destroyed and how long the restoration of the building has progressed after the destruction by using the satellite images.

A satellite image may be computed by using a neural network model. The neural network model may provide objects included in the satellite image as an output result. However, when a satellite image is taken, there may be cases where objects are obscured by clouds and the like. Even when the objects are partially hidden, it is needed to detect the objects included in the satellite image through the shape of the remaining objects and provide the detected objects as an output.

Accordingly, in the art, research is being conducted on a method to increase the accuracy of detection of an object included in a satellite image.

Korean Patent No. 2060567 discloses a method and a system for recognizing an object around ship by using a deep neural network.

SUMMARY OF THE INVENTION

The present disclosure is conceived in response to the background art, and has been made in an effort to provide a method of detecting an object.

In order to implement the foregoing object, an exemplary embodiment of the present disclosure provides a method of detecting an object, including: computing an image including an object by using an object detection model including a local block and a non-local block, in which the local block computes a relationship between adjacent pixels included in a feature map, and the non-local block computes a relationship between non-adjacent pixels included in the feature map.

In an alternative exemplary embodiment of the operations for providing the method of detecting the object, the object detection model may compute the image by using the local block and then compute the image by using the non-local block.

In the alternative exemplary embodiment of the operations for providing the method of detecting the object, the non-local block may include a layer performing a weighted sum computation for at least one pixel included in the input feature map.

In the alternative exemplary embodiment of the operations for providing the method of detecting the object, the non-local block may include a layer performing a weighted sum computation between one pixel included in the input feature map and other pixels except for the one pixel.

In the alternative exemplary embodiment of the operations for providing the method of detecting the object, the non-local block may include a layer that adds data of the input feature map to a result of the weighted sum computation.

In the alternative exemplary embodiment of the operations for providing the method of detecting the object, the object detection model may be a model in which the non-local block is added to at least a part of a pre-trained neural network model including the local block.

In the alternative exemplary embodiment of the operations for providing the method of detecting the object, the computing of the image including the object by using the object detection model including the local block and the non-local block may include computing a satellite image by using the object detection model including the local block and the non-local block.

In the alternative exemplary embodiment of the operations for providing the method of detecting the object, the method may further include detecting a road included in the satellite image as a result of the computing the satellite image.

Another exemplary embodiment of the present disclosure provides a non-transitory computer-readable medium including a computer program, wherein when the computer program is executed by one or more processors, the computer program causes following method for detecting an object to be performed, the method comprising: computing an image including an object by using an object detection model including a local block and a non-local block, in which the local block computes a relationship between adjacent pixels included in a feature map, and the non-local block computes a relationship between non-adjacent pixels included in the feature map.

Another exemplary embodiment of the present disclosure provides a server, including: a processor including one or more cores; a network unit; and a memory, in which the processor computes an image including an object by using an object detection model including a local block and a non-local block, in which the local block computes a relationship between adjacent pixels included in a feature map, and the non-local block computes a relationship between non-adjacent pixels included in the feature map.

Another exemplary embodiment of the present disclosure provides a non-transitory computer-readable medium in which a data structure corresponding to a parameter of a neural network is stored, wherein at least a part of the parameter is updated in a training process, and an operation of the neural network is at least partially based on the parameter, and wherein the neural network performs the following method and the method comprising: computing an image including an object by using an object detection model including a local block and a non-local block, the local block computes a relationship between adjacent pixels included in a feature map, and the non-local block computes a relationship between non-adjacent pixels included in the feature map.

The present disclosure may provide a method of detecting an object with high accuracy.

DETAILED DESCRIPTION

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", "unit" and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer-readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless specified otherwise or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include," "comprise," "comprising" and/or "including" shall be understood as meaning that a corresponding characteristic and/or a constituent element exists. However, a term "include," "comprise," "comprising" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the exemplary embodiment of the present disclosure, the server may also include other configurations for performing a server environment. The server may include all of the predetermined types of devices. The server is a digital device, and may be a digital device, such as a laptop computer, a notebook computer, a desk top computer, a web pad, or a mobile phone, which is equipped with a processor, including a memory, and has computing capability. The server may be a web server processing the service. The kind of foregoing server is merely an example, and the present disclosure is not limited thereto.

In the present specification, a neural network, an artificial neural network, and a network function, a network model, a neural network model and/or a model may often be interchangeably used.

Figure 1:
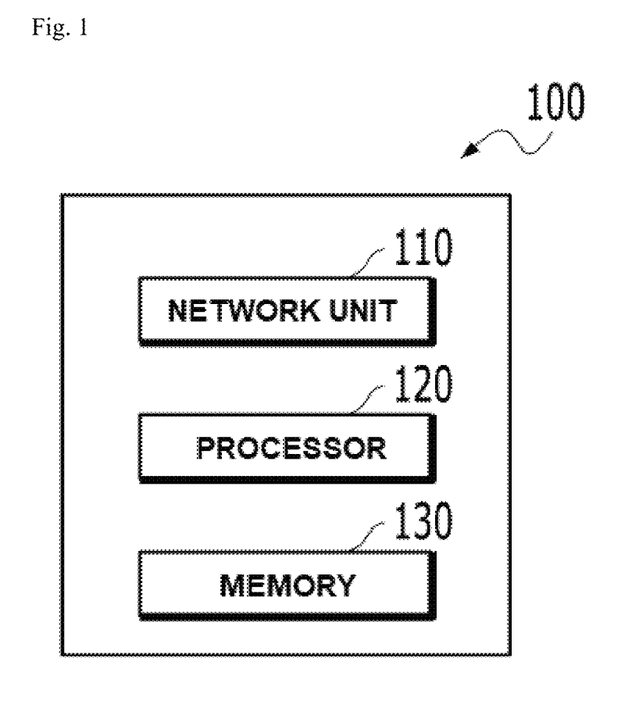
FIG. 1 is a block diagram illustrating a computing device performing operations for detecting an object according to an exemplary embodiment of the present disclosure.

FIG. 1 is a block diagram illustrating a computing device performing operations for providing a method of detecting an object according to an exemplary embodiment of the present disclosure.

A processor 120 may compute an image including an object by using an object detection model including a local block and a non-local block.

The image may be a computation target of a network function. The image may be data that is an input of training data. At least a part of the region of the image may be data that is an input of training data. The image may be data that is input to an input layer of the network function. At least a part of the region of the image may be data that is input to an input layer of the network function. The image may be, for example, an image corresponding to at least one frame of a satellite image that is obtained by photographing the earth from a satellite. The image may include meta data. The meta data may include additional information related to the image. The meta data may be, for example, latitude, longitude, or a geographic coordinate system of a satellite image. An object may be any material can be included in the image. For instance, the object may be a road, a ship, a tree, a cloud, a building and/or an aircraft included in a satellite image. The particular description of the image or the object is merely illustrative, and the present disclosure is not limited thereto.

The processor 120 may compute a satellite image by using the object detection model. The processor 120 may detect a road included in the satellite image.

Various methods of detecting an object by using satellite images are demanded in the art. Currently, in tactical situations, experienced readers manually analyze optical satellite images and identify targets, such as enemy ships, aircrafts, and the like. However, in the current situation where it is predicted that more satellite image information, such as a number of micro-satellite operating systems, will be acquired, it is difficult to rapidly and manually analyze a large number of satellite images. Accordingly, there is an increasing demand to automate the military surveillance and reconnaissance system by developing a deep learning model that is capable of automatically identifying targets in satellite images. In the meantime, in recent years, with the development of deep learning, the object identification deep learning model has been widely applied regardless of fields, such as public, industrial, and military fields. Particularly, the object identification deep learning model is expected to be highly useful in the security field where humans manually observe and analyze objects, such as Closed-Circuit Television (CCTV) and satellite images. As described above, as the use of the object identification deep learning model increases in various fields, demands for accurately identifying a location of an object in an input image and classifying the identified object into detailed categories are also increasing. However, when a size of an object in an image is relatively small, performance of the deep learning model tends to decline.

When objects, such as clouds, are partially included in the satellite image, the object included in the satellite image may be at least partially hidden. In the case where at least a part of the object is hidden, only when a relationship between non-adjacent pixels, as well as a relationship between the adjacent pixels, is considered, it is possible to accurately identify the corresponding object.

For example, even though a building is partially hidden by clouds, the corresponding object may be determined as the building by analyzing a relationship between the pixels corresponding to the remaining building that is not hidden by the clouds by using a neural network. For example, even in the case where the middle portion of the building is hidden by the clouds, when a relationship between the pixel corresponding to the left-end portion of the building and the pixel corresponding to the right-end portion of the building is computed, the fact that the corresponding object is the building may be computed by using the neural network model.

In order to solve the foregoing problems, the object detection model according to the exemplary embodiment of the present disclosure may compute a relationship between adjacent pixels by using a local block, and compute a relationship between non-adjacent pixels by using a non-local block.

The block may be a layer set including at least one layer. The block may compute and output input data. The block may compute an input image, a feature map, or a feature vector, and output a feature map, a feature vector, or data.

The object detection model will be described with reference to FIG. 2.

The object detection model may compute the image by using the local block, and then compute the image by using the non-local block.

The local block may compute a relationship between the adjacent pixels included in the feature map.

The non-local block may compute a relationship between non-adjacent pixels included in the feature map.

Figure 2:
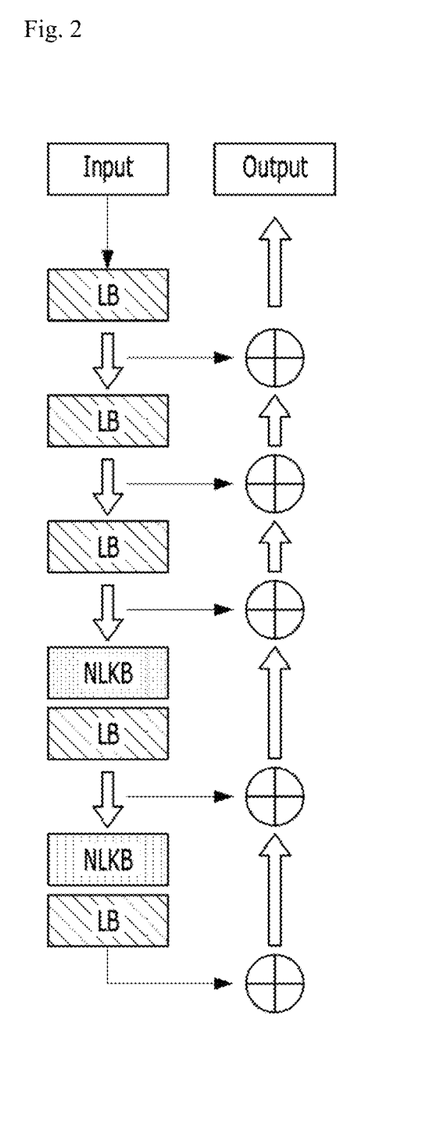
FIG. 2 is a diagram illustrating an example of a neural network model performing computation for detecting an object according to the exemplary embodiment of the present disclosure.

FIG. 2 illustrates the object detection model including a Local Block (LB) and a Non-Local Block (NLB). The object detection model may compute an input image (for example, a satellite image) by using a local block and then compute the input image by using a non-local block. A process of transmitting data from the local block illustrated in FIG. 2 to a next local block may be max pooling computation. That is, the process of transmitting data between the blocks illustrated in the lower part of FIG. 2 may be max pooling. Four arrows of the upper part illustrated in FIG. 2 may sequentially mean 1×1 convolution operation, 3×3 transpose operation by using stride 2, and 1×1 convolution operation, respectively. One arrow illustrated closest to the output of the upper part illustrated in FIG. 2 may mean 4×4 transpose convolution operation and 3×3 convolution operation.

The object detection model may include one or more local blocks and one or more non-local blocks. For example, the object detection model may sequentially compute a satellite image input by using three local blocks, and then perform the next computation by using two group blocks obtained by grouping the non-local block and the local block.

The object detection model may dispose the non-local block to be close to the last layer. When the non-local block is disposed close to the last layer, it is possible to utilize data computed by using the local layer. That is, the processor 120 may compute a relationship between adjacent pixels by computing the satellite image by using the local layer. Further, the processor 120 may compute a relationship between the non-adjacent pixels based on the relationship between the adjacent pixels. As the non-local block is close to the last layer, the feature map includes compressed information, so that as the non-local block is close to the last layer, efficiency of the non-local computation may be improved.

The method of computing the non-local block will be described with reference to FIG. 3.

The non-local block may include a layer performing a weighted sum computation for at least one pixel included in the input feature map. The non-local block may perform the weighted sum operation between all of the pixels included in the input feature map.

The non-local block may compute a relationship between all of the pixels included in the feature map. Further, Softmax illustrated in FIG. 3 is an embedded Gaussian type, and may mean applying exponential to a result obtained by calculating the similarity between two vectors through a dot product and then performing normalization later when a relationship between the pixels is computed.

The processor 120 may perform the Softmax computation and then perform a residual connection and a computation of matching a channel size. The processor 120 may perform the Softmax computation and then perform 1×1×1 convolutional operation. The processor 120 may sum an input value according to the residual connection and a value obtained through the convolutional computation.

The residual connection may be the computation of adding data of the input feature map to the weighted sum computation result. The object detection model may include a layer performing the computation of adding the data of the input feature map to the weighted sum computation result.

Figure 3:
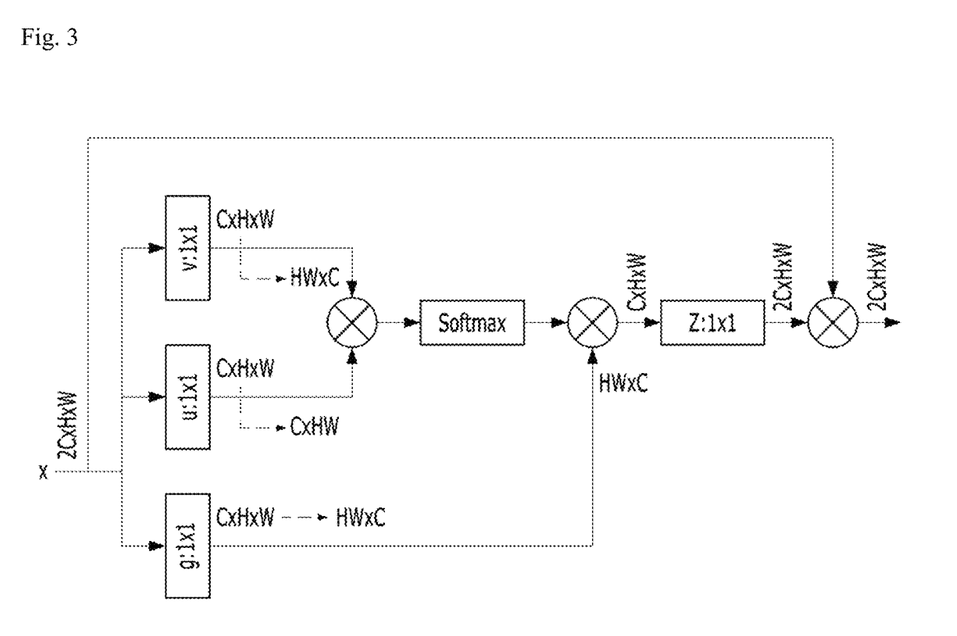
FIG. 3 is a diagram illustrating an example of the neural network model performing computation for detecting an object according to the exemplary embodiment of the present disclosure.

The uppermost arrow line of FIG. 3 may be schematic data for representing the residual connection. That is, the residual connection may be an addition of a kind of skip connection to a stacked network. The processor 120 may add the input value to an output of the stacked layer. That is, the processor 120 may perform a computation of adding the input data of the non-local block to the output again.

In general, when training is performed by stacking multiple layers, lower performance may be exhibited when the number of layers is more than a certain number. That is, when the number of stacked layers is large, more training errors and more test errors may occur. In order to solve the errors, the residual connection may be used. When the residual connection is used, there may be an advantage in that training is considerably easier compared to the existing method. Further, a degration problem that may occur in the training process may be solved by using the residual connection.

When the residual connection is used, even though the multiple layers are stacked, training and inference performance may not be degraded. Accordingly, even though the residual connection is added to the non-local block of the object detection model according to the exemplary embodiment of the present disclosure and the multiple layers are stacked in the non-local block, it is possible to prevent training performance from being degraded.

FIG. 3 is merely the diagram illustrating the example of the computation process of the non-local block for computing the relationship between the non-adjacent pixels according to the exemplary embodiment of the present disclosure, and the present disclosure is not limited thereto.

The object detection model may be the deep neural network. Throughout the present specification, a nerve network, the network function, and the neural network may be used with the same meaning. A deep neural network (DNN) may mean the neural network including a plurality of hidden layers, in addition to an input layer and an output layer. When the DNN is used, it is possible to recognize a latent structure of data. That is, it is possible to recognize the latent structures of pictures, texts, videos, voices, and music (for example, an object included in the picture, the contents and the emotion of the text, and the contents and the emotion of the voice). The deep neural network may include a Convolutional Neural Network (CNN), a Recurrent Neural Network (RNN), a Restricted Boltzmann Machine (RBM), a Deep Belief Network (DBN), a Q network, a U network, Siamese network, and the like.

The convolutional neural network is a kind of deep neural network, and includes a neural network including the convolutional layer. The convolutional neural network is one type of multiplayer perceptorns designed to use a minimum preprocess. The CNN may consist of one or more several convolutional layers and artificial neural network layers combined with the convolutional layers. The CNN may additionally use a weight and pooling layers. Due to the structure, the CNN may sufficiently use input data of a two-dimensional structure. The convolutional neural network may be used to recognize an object in an image. The convolutional neural network may represent and process image data with a matrix having a dimension. For example, in the case of image data encoded in red-green-blue (RGB), each R, G, and B color may be represented as two-dimensional (for example, in the case of a two-dimensional image) matrix. That is, a color value of each pixel of the image data may be a component of the matrix, and a size of the matrix may be the same as the size of the image. Accordingly, the image data may be represented with three two-dimensional matrixes (a three-dimensional data array).

A convolutional process (input/output of the convolutional layer) may be performed by multiplying a convolutional filter and a component of the matrix in each position of the image while moving the convolutional filter in the convolutional neural network. The convolutional filter may be formed of an n×n matrix. The convolutional filter may be formed of the fixed type of filter of which the number of pixels is generally smaller than the total number of pixels of the image. That is, in the case where an m×m image is input to the convolutional layer (for example, a convolutional layer in which a size of the convolutional filter is n×n), the matrix representing n×n pixels including each pixel of the image may be a multiplication of the convolutional filter and the component (that is, the multiplication of each component of the matrix). By the multiplication of the convolutional filter and the component, the component matching the convolutional filter may be extracted from the image. For example, a 3×3 convolutional filter for extracting upper and lower linear components from an image may be configured as [[0,1,0], [0,1,0], [0,1,0]]. When the 3×3 convolutional filter for extracting the upper and lower linear components from the image is applied to the input image, the upper and lower linear components matching the convolutional filter are extracted from the image and output. The convolutional layer may apply the convolutional filter to each matrix (that is, in the case of R, G, B coding image, R, G, and B colors) for each channel representing the image. The convolutional layer may extract a feature matching the convolutional filter from the input image by applying the convolutional filter to the input image. The filter value (that is, the value of each component of the matrix) of the convolutional filter may be updated by backpropagation in the training process of the convolutional neural network.

A sub-sampling layer is connected to the output of the convolutional layer to simplify the output of the convolutional layer and reduce the amount of use of the memory and the amount of computation. For example, when the output of the convolutional layer is input to the pooling layer having a 2×2 max pooling filter, the image may be compressed by outputting the maximum value included in each patch for each 2×2 patch in each pixel of the image. The foregoing pooling may also be the scheme of outputting a minimum value in the patch or outputting an average value of the patch, and a predetermined pooling scheme may be included in the present disclosure.

The convolutional neural network may include one or more convolutional layers and a sub-sampling layer. The convolutional neural network may extract a feature from an image by repeatedly performing a convolutional process and a sub-sampling process (for example, the foregoing max pooling and the like). Through the repeated convolutional process and the sub-sampling process, the neural network may extract a global feature from the image.

The output of the convolutional layer or the sub-sampling layer may be input to a fully connected layer. The fully connected layer is the layer in which all of the neurons in one layer are connected to all of the neurons in an adjacent layer. The fully connected layer may mean a structure in which all of the nodes of each layer are connected to all of the nodes of another layer in the neural network.

In the exemplary embodiment of the present disclosure, in order to perform segmentation on medical data included in a medical image, the neural network may include a Deconvolutional Neural Network (DCNN). The deconvolutional neural network performs a similar operation to an operation of calculating the convolutional neural network in a reverse direction. The deconvolutional neural network may output a feature extracted in the convolutional neural network with a feature map related to the original data. A particular configuration of the convolutional neural network is discussed in more detail in US Patent No. US9870768B2, which is incorporated by reference in its entirety in the present application.

Hereinafter, a method of training the object detection model will be described.

The object detection model may be the model in which the non-local block is added to at least a part of the pre-trained neural network model including the local block.

The processor 120 may configure a new object detection model by adding the non-local block of the pre-trained neural network model. The pre-trained neural network model may be the model that does not include the non-local block. The pre-trained neural network model may be the model that includes only one or more local blocks.

When the model including only the local blocks are pre-trained and then the non-local block is added to the pre-trained model, performance of the object detection model may be improved.

The object detection model may train a relationship between the adjacent pixels through the model including only the local blocks, and then compute a relationship between the non-adjacent pixels based on the relationship between the adjacent pixels through the non-local blocks added thereafter.

The particular description of the method of training the object detection model is merely illustrative, and the present disclosure is not limited thereto.

Figure 4:
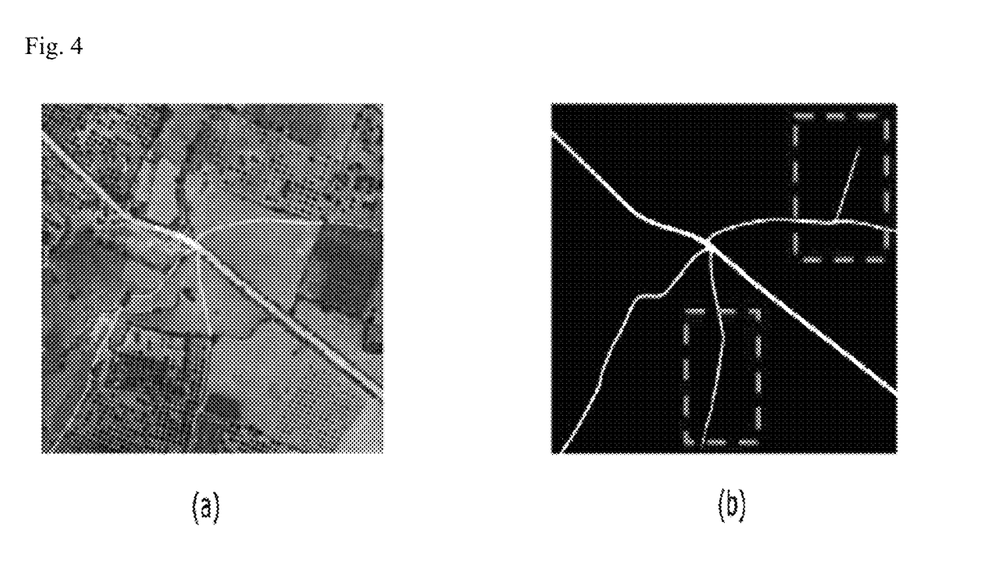
FIG. 4 is a diagram illustrating an example of a satellite image and a road detection result included in the satellite image according to the exemplary embodiment of the present disclosure.

FIG. 4 is a diagram illustrating input data and output data of the object detection model according to the exemplary embodiment of the present disclosure.

(a) of FIG. 4 is an example of a satellite image. The satellite image illustrated in (a) of FIG. 4 may be computed by using the object detection model.

(b) of FIG. 4 is a diagram illustrating an example of a result of the detection of roads included in the satellite image.

The processor 120 may output and display a road detection result in a user interface. The processor 120 may display the roads in white and the remaining portions except for the roads in black. The processor 120 may generate an annotation indication in red in the road portion.

The computing device 100 for providing the method of detecting the object according to the exemplary embodiment of the present disclosure may include a network unit 110, the processor 120, and a memory 130.

The network unit 110 may transceive an image (for example, a satellite image) according to the exemplary embodiment of the present disclosure with another computing device, a server, and the like. Further, the network unit 110 enables the plurality of computing devices to communicate, so that the operations for training the model may be distributed and performed in the plurality of computing devices. The network unit 110 enables the plurality of computing devices to communicate, so that the computation for training the model by using the network function may be distributed and processed.

The network unit 110 according to the exemplary embodiment of the present disclosure may be operated based on any type of wired/wireless communication technology currently used and implemented, such as near field (short-range) communication technology, long-distance communication technology, and wire communication technology, and wireless communication technology, and may be used in another networks.

The processor 120 may be formed of one or more cores, and may include a processor, such as a central processing unit (CPU), a general-purpose graphics processing unit (GPGPU), and a tensor processing unit (TPU) of the computing device, for training a model. The processor 120 may read a computer program stored in the memory 130 and provide the method of detecting the object according to the exemplary embodiment of the present disclosure. According to the exemplary embodiment of the present disclosure, the processor 120 may perform a calculation for providing the method of detecting the object.

The memory 130 may store the computer program for providing the method of detecting the object according to the exemplary embodiment of the present disclosure, and the stored computer program may be read and driven by the processor 120.

The memory 130 according to the exemplary embodiment of the present disclosure may store a program for an operation of the processor 120, and may temporarily and permanently store input/output data or events. The memory 130 may store data for display and sound. The memory 130 may include at least one type of storage medium among a flash memory type, a hard disk type, a multimedia card micro type, a card type of memory (for example, an SD or XD memory), a Random-Access Memory (RAM), a Static Random-Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

According to the exemplary embodiment of the present disclosure, a computer-readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer-readable storage medium (for example, a permanent storage device). In particular, the data structure may include a set of data, a relationship between data, and a function or a command applicable to data. Through the effectively designed data structure, the computing device may perform a computation while minimally using resources of the computing device. In particular, the computing device may improve efficiency of computation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In, First Out, LIFO) in which the later the data enters, the sooner the data comes out. The queue is a data listing structure with limited access to data, and may have a data structure (First In, First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a computation model, a nerve network, the network function, and the neural network may be used with the same meaning. Hereinafter, the terms of the computation model, the nerve network, the network function, and the neural network are unified and described with a neural network. The data structure may include a neural network. Further, the data structure including the neural network may be stored in a computer-readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer-readable medium may include a computer-readable recording medium and/or a computer-readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer-readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning). Further, the data structure including the weight of the neural network may be stored in the computer-readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer-readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the computation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer-readable medium. The hyper-parameter may be a variable varied by a user. The hyper-parameter may include, for example, a learning rate, a cost function, the number of times of repetition of the training cycle, weight initialization (for example, setting of a range of a weight to be weight-initialized), and the number of hidden units (for example, the number of hidden layers and the number of nodes of the hidden layer). The foregoing data structure is merely an example, and the present disclosure is not limited thereto.

An order of the method of detecting the object according to the exemplary embodiment of the present disclosure will be described.

The computing device 100 may compute a satellite image by using the object detection model. The computing device 100 may detect roads included in the satellite image.

The computing device 100 may compute an image including an object by using the object detection model including a local block and a non-local block. The image may be a computation target of a network function. The image may be data that is an input of training data.

The block may be a layer set including at least one layer. The block may compute and output input data. The block may compute an input image, a feature map, or a feature vector, and output a feature map, a feature vector, or data.

The local block may compute a relationship between the adjacent pixels included in the feature map.

The non-local block may compute a relationship between non-adjacent pixels included in the feature map.

The computing device 100 may compute the input image (for example, the satellite image) by using the local block, and then compute the input image by using the non-local block by using the object detection model. The object detection model may include one or more local blocks and one or more non-local blocks. For example, the object detection model may sequentially compute a satellite image input by using three local blocks, and then perform a next computation by using two group blocks obtained by grouping the non-local block and the local block.

The object detection model may dispose the non-local block to be close to the last layer. When the non-local block is disposed close to the last layer, it is possible to utilize data computed by using the local layer.

The computing device 100 may configure a new object detection model by adding the non-local block to a pre-trained neural network model. The pre-trained neural network model may be the model including no non-local block. The pre-trained neural network model may the model including only one or more local blocks.

The method of detecting the object according to the exemplary embodiment of the present disclosure may be implemented by a module, a circuit, a means, and logic performing the foregoing operations.

Figure 5:
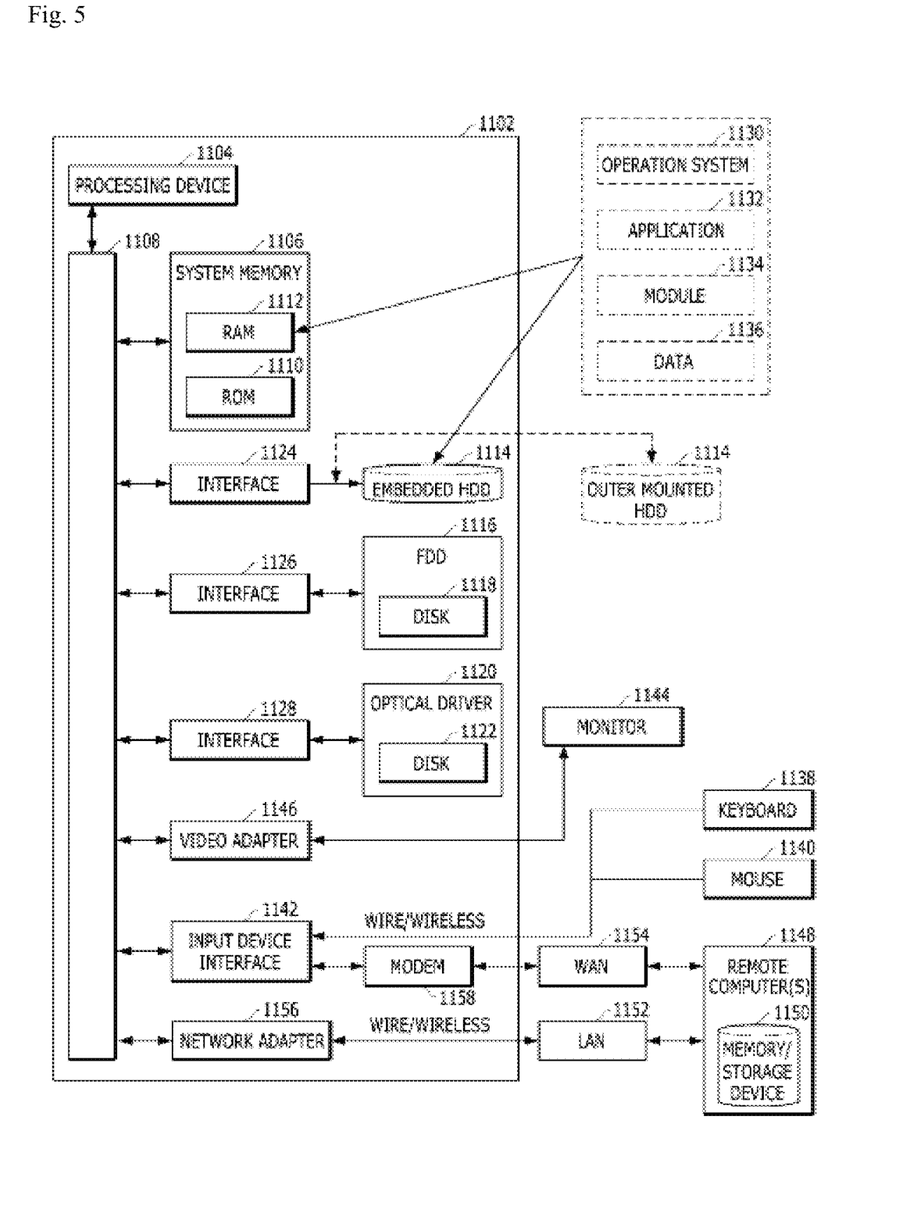
FIG. 5 is a block diagram illustrating the computing device according to the exemplary embodiment of the present disclosure.

FIG. 5 is a block diagram illustrating the computing device according to the exemplary embodiment of the present disclosure.

FIG. 5 is a simple and a general schematic diagram illustrating an example of a computing environment in which the exemplary embodiments of the present disclosure are implementable.

The present disclosure has been generally described in relation to a computer-executable command executable in one or more computers, but those skilled in the art will appreciate well that the present disclosure may be implemented in combination with other program modules and/or in a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer-readable media. A computer accessible medium may be a computer-readable medium regardless of the kind of medium. The computer-readable medium includes volatile and non-volatile media, transitory and non-transitory media, and portable and non-portable media. As a non-limited example, the computer-readable medium may include a computer-readable storage medium and a computer-readable transmission medium. The computer-readable storage medium includes volatile and non-volatile media, transitory and non-transitory media, and portable and non-portable media constructed by a predetermined method or technology, which stores information, such as a computer-readable command, a data structure, a program module, or other data. The computer storage medium includes a Read-Only Memory (RAM), a Read-Only Memory (ROM), Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer-readable transport medium generally implements a computer-readable command, a data structure, a program module, or other data in a modulated data signal, such as other transport mechanisms, and includes all of the information transport media. The modulated data signal means a signal, of which one or more of the characteristics are set or changed so as to encode information within the signal. As a non-limited example, the computer-readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer-readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110 and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer-readable media associated with the drives provide non-volatile storage of data, data structures, computer-executable commands, and the like. In the case of the computer 1102, the drive and the medium correspond to the storage of random data in an appropriate digital form. In the description of the computer-readable storage media, the HDD, the portable magnetic disk, and the portable optical media, such as a CD, or a DVD, are mentioned, but those skilled in the art will well appreciate that other types of computer-readable media, such as a zip drive, a magnetic cassette, a flash memory card, and a cartridge, may also be used in the illustrative operation environment, and the predetermined medium may include computer-executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method of detecting an object included in an image by using an object detection model performed by a computing device, the method comprising:
   outputting a feature map by computing a relationship between adjacent pixels in the image and excluding non-adjacent pixels, by using only a local block included in the object detection model, and
   computing a relationship between non-adjacent pixels and excluding adjacent pixels in the image by performing a weighted sum computation for all pixels included in the feature map, by using only a non-local block included in the object detection model.

2. The method of claim 1, wherein the object detection model computes the image by using the local block and then computes the image by using the non-local block.

3. The method of claim 1, wherein the non-local block includes a layer performing a weighted sum computation between one pixel included in the feature map and other pixels except for the one pixel.

4. The method of claim 1, wherein the non-local block includes a layer that adds data of the feature map to a result of the weighted sum computation.

5. The method of claim 1, wherein the object detection model is a model in which the non-local block is added to at least a part of a pre-trained neural network model including the local block.

6. The method of claim 1, wherein the computing of the image including the object by using the object detection model including the local block and the non-local block includes computing a satellite image by using the object detection model including the local block and the non-local block.

7. The method of claim 6, further comprising:
   detecting a road included in the satellite image as a result of the computing the satellite image.

8. A non-transitory computer-readable medium in which a data structure corresponding to a parameter of a neural network is stored, wherein at least a part of the parameter is updated in a training process, and an operation of the neural network is at least partially based on the parameter, and wherein the neural network performs the following method and the method comprising:
   outputting a feature map by computing a relationship between adjacent pixels in an image and excluding non-adjacent pixels, by using only a local block included in an object detection model, and
   computing a relationship between non-adjacent pixels in the image and excluding adjacent pixels by performing a weighted sum computation for all pixels included in the feature map, by using only a non-local block included in the object detection model.

9. A server, comprising:
   a processor including one or more cores;
   a network unit; and
   a memory,
   wherein the processor outputs a feature map by computing a relationship between adjacent pixels in an image and excluding non-adjacent pixels, by using only a local block included in an object detection model, and computes a relationship between non-adjacent pixels in the image and excluding adjacent pixels by performing a weighted sum computation for all pixels included in the feature map, by using only a non-local block included in the object detection model.

* * * * *